Sept. 21, 1943.    T. ZUSCHLAG    2,329,811
ELECTROMAGNETIC INSPECTION
Filed Nov. 6, 1941    2 Sheets-Sheet 1

INVENTOR
*Theodore Zuschlag*
BY
*Pennie, Davis, Marvin and Edmonds.*
ATTORNEYS

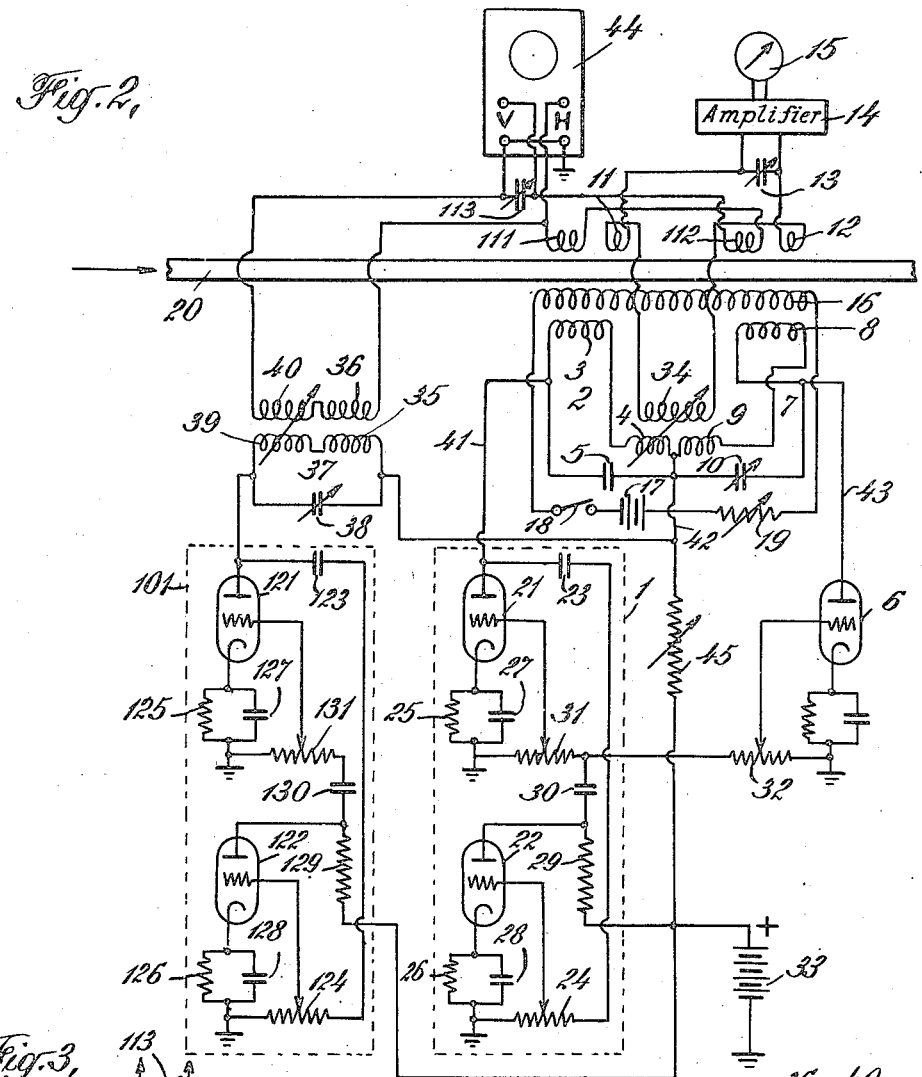

Patented Sept. 21, 1943

2,329,811

UNITED STATES PATENT OFFICE 2,329,811

ELECTROMAGNETIC INSPECTION

Theodore Zuschlag, West Englewood, N. J., assignor to Magnetic Analysis Corporation, Long Island City, N. Y., a corporation of New York Application November 6, 1941, Serial No. 417,976

19 Claims. (Cl. 175—183)

This invention relates to the art of non-destructive testing and inspection of metallic material, and more especially to electromagnetic inspection of such material by the use of alternating current fields. Specifically, the invention contemplates the use of two separate sources of alternating current and the observation of differences between the voltages and phases of such sources resulting from the presence of variations or of defects in the material under inspection.

This application is a continuation in part of my application for U. S. Letters Patent Serial No. 415,551, filed October 18, 1941. According to the invention of the mentioned application a detector circuit or a secondary circuit, or both, is provided to balance the voltage developed by an oscillator against another voltage developed in an auxiliary circuit but derived from the same oscillator. In accordance with the present invention two separate oscillators are provided, the second oscillator being part of an auxiliary oscillator system, and the voltage output developed by this auxiliary system is compared, as to magnitude and phase or frequency, with the voltage output of the main oscillator system. In order to make this comparison of voltages the two oscillators should be synchronized as to frequency under "standard" conditions.

Methods and apparatus heretofore proposed for electromagnetic inspection of metallic materials have included the use of alternating current for energizing the material as is done in the present case, but one difficulty usually present in such former systems has been in maintaining the energizing coil tuned to the frequency of the source of alternating current. By utilizing apparatus in certain respects similar to that of my mentioned prior application, the present invention overcomes this difficulty by including an oscillator as a part of each energizing system to furnish the alternating current. Furthermore the oscillators are preferably of the variable feedback type employed in such manner as to provide maximum reaction in the presence of defects and variations in the material under test.

Other features of this invention comprise an improved pickup system including detector coils so related to the several circuits that one or more indicating devices coupled thereto will give extremely sensitive indication of variations or changes in material, composition or both. In other words, the system according to this invention is capable of indicating changes in structure, composition and physical dimensions, as well as flaws such as seams, cracks and cavities. By employing an oscillograph as one of the indicating devices of the present invention in combination with the auxiliary oscillator, it is possible to observe not only the extent and nature of defects and changes in the material, but also the magnitudes of such defects and changes, which is not possible with the apparatus of my prior application above referred to.

The foregoing and additional advantages introduced by this invention will become more apparent upon consideration of the following specification taken together with the drawings, wherein:

Fig. 1 is a circuit diagram of one embodiment of the invention wherein a voltage produced in a tuned energizing coil which is energized by a main oscillator is compared with a voltage produced in a standard coil by an auxiliary oscillator, the standard coil not being in inductive relation to the object under test. This embodiment is especially useful for indicating variations in the composition of the material under test and also for indicating the extent and magnitude of defects and variations.

Fig. 2 is a circuit diagram of a preferred embodiment of the invention which combines features of the circuit of Fig. 1 with features making possible additionally the indication of the nature, magnitude and extent of structural defects in the material under test and with greatly increased sensitivity.

Figs. 3 and 4 illustrate the manner in which the coils of Figs. 1 and 2 may be physically disposed in two alternative arrangements.

Figure 1:
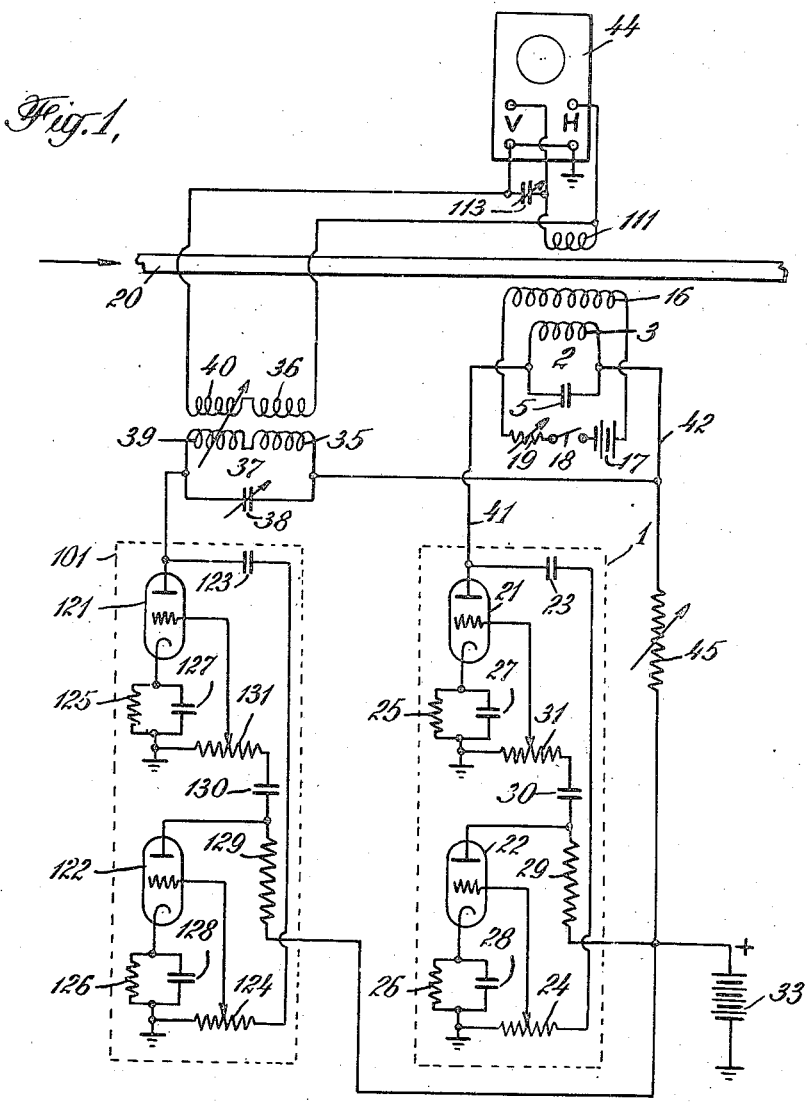

Referring now to the circuit diagram of Fig. 1, the apparatus included within the dash-line rectangle I comprises an oscillator of the variable feedback type. An oscillator of this type is described in my copending U. S. patent application, Ser. No. 301,179, filed Oct. 25, 1939, now Patent No. 2,267,884. This oscillator includes two three-electrode vacuum tubes 21 and 22, and preferably they may comprise a tube of twin-type construction such as that known as type 6F8. The anode of tube 21 is coupled by means of condenser 23 to the adjustable potentiometer 24, the slider of which is connected to the grid of tube 22. This potentiometer thus controls the magnitude of voltage impressed on the grid of tube 22 which is derived from the output of tube 21. The cathodes of tubes 21 and 22 are coupled to ground through cathode biasing networks consisting of resistors 25 and 26 shunted by condensers 27 and 28, respectively. The anode of tube 22 is connected to the positive pole of potential source 33 through fixed resistor 29, and is coupled to potentiometer 31 through coupling condenser 30. The slider of potentiometer 31, which adjusts the effective amplification of tube 21, is connected to the grid of tube 21. Thus the output of tube 22 is coupled to the input of tube 21 by condenser 30 and potentiometer 31.

In addition to being coupled to the input of tube 22 the output of tube 21 (which is also the output of the oscillator) is connected to tuned circuit 2 which consists of an alternating current energizing coil or oscillator primary 3 and fixed condenser 5. The anode circuit of tube 21 is completed through coil 3 through variable resistance 45 to the positive terminal of anode potential source 33. The anode of tube 22 also derives its anode potential from the same source but through resistance 29. The function of rheostat 45 will be described later.

A separate oscillator 101 of the feedback type is shown enclosed in a separate dash-line rectangle. This may be termed the auxiliary oscillator and may be understood to comprise elements similar to those of main oscillator 1. The corresponding elements thereof are marked with the same reference characters as the elements of oscillator 1, plus 100. The anode of tube 121 of oscillator 101 is connected to tuned circuit 37 which comprises primary energizing coil 35 in series with the variocoupler primary winding 39, both of which are shunted by variable condenser 38. Coil 35 may be considered as a "standard" coil. The secondary coil 36 coupled to primary coil 35 is connected in series with the adjustable variocoupler secondary 40 and is connected in opposition with the detector coil or secondary 111 coupled to energizing primary coil 3. Secondary coils 40 and 36 and primary coils 39 and 35 may be combined into one movable secondary coil and one primary coil, respectively, with a somewhat decreased fineness of control and a somewhat decreased sensitivity. The anode of tube 121 is furnished with anode potential through rheostat 45, as is that of tube 21. The anode of tube 122 is furnished with anode potential through resistor 129 in a manner corresponding to that described in connection with tube 22.

In addition to the coil system including coils 3 and 111 which are arranged to be placed in magnetic relation to the object 20 under test, there is provided a direct-current energizing coil 16 which is connected in series with direct-current source 17, switch 18 and control rheostat 19, which is variable to control the strength of the direct-current magnetic field set up by coil 16. I have found that a coil having about 4,000 or 5,000 ampere turns is sufficient. The manner of use of this direct-current circuit will be described below. Coils 3, 111 and 16 are preferably disposed in a symmetrical assembly and arranged to be placed in inductive relation to the article under test or inspection, as represented by the bar 20. Usually this material under test would be placed either within the mentioned coils, as shown in Fig. 3, or symmetrically adjacent them, as shown in Fig. 4.

Energizing coil 3 is inductively coupled to the secondary or detector coil 111, and primary energizing coil 35 is coupled to secondary coil 36. Coils 111 and 36 are connected in a secondary or detector circuit which also includes in series a variocoupler secondary coil 40 and tuning condenser 113. This series circuit is connected to the input terminals of an indicating device 44, here represented as an oscillograph of the cathode-ray type. It may be assumed that the two binding posts marked "V" at the left in the drawings (where the oscillograph 44 is represented) are connected to the "vertical" plates of the oscillograph and the two binding posts marked "H" on the right are connected to the "horizontal" plates, and that the local or sweep-circuit oscillator usually included in such an oscillograph would not be utilized. Although in the system of the present invention which includes two oscillators, the use of an oscillograph as an indicating device introduces certain important advantages, it is nevertheless feasible to substitute for the oscillograph shown an indicating meter such as a milliammeter. In this event the center lead of the three connections, as shown, to the oscillograph would be broken and the indicating meter would be coupled across the terminals of the variable condenser 113. Such an arrangement is illustrated in Fig. 2 of my mentioned application, Serial No. 415,551. The purpose of tuning condenser 113 is to increase the voltage impressed on the indicating device at the desired frequency and to decrease the voltages at undesired, usually harmonic, frequencies.

For convenience the apparatus above described in connection with Fig. 1 may be considered to be divided into two systems, namely an oscillator system and an auxiliary system. The oscillator system comprises oscillator 1, energizing coil 3, and secondary or detector coil 111. Coils 3 and 111 of this system together with coil 16 of the direct-current system are arranged to be placed in inductive relation to the material under test. The auxiliary system comprises auxiliary oscillator 101, auxiliary primary coil 35 and variocoupler primary 39 and their respective secondary coils 36 and 40. These auxiliary coils are not in inductive relation with the article under test. Detector coil 111 is both a part of the auxiliary system and of the oscillator system because it is electrically connected to a coil in the first and inductively coupled to a coil in the second. Alternatively, these two systems may be termed respectively the main oscillator system and the auxiliary oscillator system, the reason for which will be more apparent upon consideration of Fig. 2.

The system of Fig. 1 is adjusted as follows: Potentiometers 24 and 31 are first adjusted to place main oscillator 1 in oscillating condition, while oscillograph 44 is observed. If coils 40, 36 and 111 are connected across the vertical plates of this oscillograph a relatively large pattern will suddenly appear, after which by careful manipulation of potentiometers 24 and 31 this pattern can be decreased to a minimum size indicating that the oscillator 1 is oscillating, but not violently. Assuming that the specimen 20 under test, which may be either moving or stationary, is placed in inductive relation with the coils 3, 111 and 16 direct current may be caused to flow in coil 16, by closure of switch 18. Next potentiometers 124 and 131 of oscillator 101 are adjusted as are also variocoupler 39, 40 and tuning condenser 38 until the wave pattern shown on the oscillograph first dissolves into a stationary single circle or ellipse. Generally speaking, the adjustment of the tuning condenser 38 not only changes the frequency at which the auxiliary system oscillates but also may be employed to vary the phase of the auxiliary system output voltage until it is identical with the phase of the output voltage of the main oscillator system. The final adjustment as to amplitude then is obtained by suitably varying the settings of the variocoupler 39, 40 until the oscillograph pattern presents a straight horizontal line. The adjustment just described assumes, of course, that the article under test is of a "standard" nature.

All oscillators have a tendency to drift, which tendency makes it difficult to maintain two free oscillator systems in continuous synchronism. This difficulty is overcome in the present invention by adjusting the value of rheostat 45 until the resistance thereof is just enough to introduce sufficient coupling between the two oscillators to assure a stationary image or pattern on the oscillograph screen under "standard" conditions. It has been found that a rheostat 45 having a resistance range of from 0 to 25,000 ohms is satisfactory.

A testing arrangement of the type above described permits a quantitative investigation of defects or variations as well as an investigation of structural conditions by analysis of the configuration and motion, if any, of the resultant oscillograph wave pattern. Slight variations from the arbitrarily determined electrical standard condition causes a tilting of the horizontal wave line, or changes this line into a narrow ellipse. A more serious defect will cause the ellipse to broaden and tilt and finally to change into a circle; while still more serious defects change the electrical characteristics of at least one of the oscillator systems to such an extent that it overcomes the synchronizing effect of rheostat 45 whereby the oscillators will oscillate at different frequencies and will produce a slow or rapid revolution of the resultant wave pattern, the number of revolutions per unit of time being a function of the magnitude of the variation of the material from standard.

From the foregoing description it will be clear that through the use of an oscillograph in connection with the double oscillator system of the present invention, it is possible to obtain considerably more information concerning the nature and magnitude of defects or changes in composition or form of the material than could be obtained from the usual indicating device of the meter type. Such information includes an indication of the full length of flaws as well as the magnitude thereof. However, the system illustrated in Fig. 1 is not sufficiently sensitive to indicate extremely minute flaws or variations in the material which are sometimes of importance. Consequently, the preferred form of my invention includes not only all of the advantages above described in connection with the system of Fig. 1, but includes additional advantages including that of considerably increased sensitivity. Such a system will now be described in connection with Fig. 2.

Referring to Fig. 2, oscillator 1, which is similar to oscillator 1 described above in connection with Fig. 1, is connected to a coil system which is similar to that illustrated in Fig. 1 of my mentioned prior application Serial No. 415,551. As in the Fig. 1 arrangement, the output of tube 21 of main oscillator 1 is coupled through condenser 23 to the input of tube 22 and also is connected to tuned circuit 2 which consists of an alternating-current energizing coil or oscillator primary 3 connected in series with variocoupler primary winding 4 and fixed condenser 5. The output of tube 22 of this variable feedback oscillator is coupled through condenser 30 to volume control potentiometer 32, the slider of which is connected to the grid of an amplifier tube 6. Potentiometer 32 controls the effective amplification of amplifier tube 6 and the output of this tube is connected to tuned circuit 7 which in electrical characteristics is similar to tuned circuit 2. This circuit includes energizing coil or oscillator primary 8 connected in series with variocoupler primary winding 9, the other half of the variocoupler primary coil being winding 4 above mentioned. Both primaries 8 and 9 are shunted by the variable tuning condenser 10. The two energizing coils or oscillator primaries 3 and 8 are inductively coupled respectively to concentrically arranged secondaries or detector coils 11 and 12 which are connected in opposition with regard to the current flowing in primaries 3 and 8. The differential output voltage of the two series-connected secondaries 11 and 12 which are shunted by tuning condenser 13 is coupled to an amplifier 14 and may be indicated by means of meter 15. Tuning condenser 13 is connected across the leads to the indicating device to increase the desired voltages and decrease the undesired voltages as described in connection with condenser 113 of Fig. 1.

Amplifier 14 should be suitable for the frequencies employed in which event the meter 15 would be a suitable alternating-current indicating device, usually a milliammeter; or the amplifier may include a rectifier and direct-current amplifier, in which case the meter 15 would be a direct-current instrument, as described in my mentioned prior Patent No. 2,267,884. Tuned circuit 7 together with amplifier 6 which feeds it may be termed an auxiliary circuit. This circuit together with auxiliary detector coil 12 coupled thereto comprises an auxiliary system because it is employed to balance the main oscillator system which comprises oscillator 1, tuned circuit 2, and detector coil 11 coupled thereto. Variocoupler secondary coil 34 is common to both the auxiliary system and main oscillator system. Current flows in opposite directions in coils 3 and 8 so it is necessary to reverse these coils with respect to each other in order that together they may produce a single energizing field. One of coils 11 and 12 is then reversed with respect to this field to provide the required balance.

Variocoupler 4—9, 34, reduces the efficiency of the energizing coils 3, 8 in the ratio of their respective inductances. It is therefore preferable to keep the number of primary turns of the variocoupler as low as possible. This variocoupler may conveniently be constructed from a suitable type of variometer by disconnecting the rotor and stator windings to form a movable secondary coil and split primary coils. The purpose of this variocoupler is to control the amplitude of the effective voltage induced in the secondary or detector circuit, and, therefore, an alternative arrangement can be here employed which eliminates the variocoupler and allows of fine adjustment by a decade potentiometer which replaces the simple potentiometer 32. It has been found in practice that by the use of such a decade potentiometer connected as just indicated, a degree of control is obtained in a ratio of as much as 1 to 100,000 which is ordinarily ample for the purpose.

Consideration of the circuit arrangement of

Fig. 2 will show that the frequency of the alternating current flowing in coil 3 is determined by the electrical constants of circuit 2, that a corresponding alternating voltage is impressed upon amplifier tube 6, and that the magnitude of the current of like frequency which flows in energizing coil 8 is controlled by adjustment of potentiometer 32. If the electrical constants of the two tuned circuits 2 and 7 are alike it is possible to make the voltage induced in secondaries 11 and 12 identical. In this case, of course, no deflection is shown at meter 15. The strength of the differential field impressed across condenser 13 may be varied considerably by suitable tuning of this circuit to or near the frequency of oscillator 1. By such tuning the voltage input to the amplifier 14 is increased and transfer of undesirable harmonics is decreased. Adjustment of potentiometers 24 and 31 may vary the frequency of the oscillator slightly, but this does not affect the essential operation because it may be compensated for.

As long as the specimen 20 under test is uniform the output of amplifier 14 will remain substantially zero, but as soon as a defect or otherwise different section of the specimen enters the field of coil 3 (assuming movement from left to right as indicated by the arrow), the tuning of circuit 2 changes and the oscillator operates at a different frequency. This upsets the balance between the secondary coils 11 and 12 which results in a deflection of meter 15. The amount of this deflection depends not only upon the nature of the disturbance, which in turn depends upon the nature of the defect and its effect upon the apparent inductance of coil 3, but also upon the adjustment of oscillator 1 with regard to the setting of feedback potentiometer 24 and the tuning of the secondary circuit 11, 12, 13. The mentioned change in apparent inductance of coil 3 not only causes the oscillator to operate at a different frequency, but also results in a change in the electrical characteristics of tuned circuit 2 so that it completely differs from that of tuned circuit 7 which then carries current at a frequency for which it was not originally adjusted. The result of this upset condition causes a pronounced indication of the meter 15 even for a most minute defect in the material under test, thus providing extraordinarily great sensitivity in the main oscillator and auxiliary systems under discussion.

In the system of Fig. 2 an auxiliary oscillator is provided in the manner described above in connection with Fig. 1, and similarly this oscillator together with its coil system may be termed an auxiliary oscillator system. In the system of Fig. 2 as in that of Fig. 1 there is also preferably employed an oscillograph 44 for indicating the magnitudes of changes in structure or composition of the material under test, as described. The system of Fig. 2 differs from that of Fig. 1, not only as already indicated, but also in that the secondary circuit which includes coils 10, 36 and 111, also includes a coil 112 which is coupled to energizing primary coil 8 of the auxiliary system. Thus the indicating device 44 is connected to coil 111 which is coupled in the main oscillator system, and to coils 40 and 36 coupled in the auxiliary oscillator system, and to coil 112 coupled in the auxiliary system. Thus a coil in each of the systems is connected to a coil coupled to each of the other systems, whereby the balance of the combined system depends not only upon balances in the separate systems but also upon balances between the systems. This interrelated balance provides an interrelated response and sensitivity greater than that of either system alone and superior to that of a mere summation of the systems.

The system of Fig. 2 may be adjusted as follows: Potentiometers 24 and 31 are first adjusted to place oscillator 1 itself in oscillating condition while indicating meter 15 is observed. Usually this meter will give a sudden high reading after which by careful manipulation of potentiometers 24 and 31 this reading can be carefully decreased to a low value indicating that the oscillator is oscillating, but not violently. Assuming that the specimen 20 under test, which may be either moving or stationary, is placed in inductive relation with the coils 3, 8, 11, 12, 111, 112 and 16, direct current is first caused to flow in coil 16 by closure of switch 18. Next, tuning condenser 10 and potentiometer 32 are adjusted until meter 15 indicates a minimum reading, ordinarily substantially zero. Condenser 10 is employed to adjust the phase of the current in coil 8 in relation to the current in coil 3. Subsequent adjustment of varicoupler secondary coil 34 with respect to stationary primary windings 4 and 9 enables attainment of a fine adjustment in the secondary detector circuit including coils 11 and 12; and because of the design of the varicoupler this adjustment may provide a range from positive to zero through negative values. Following this adjustment, the auxiliary oscillator system is adjusted as described above in connection with Fig. 1, while oscillograph 44 is observed. Because of the mutual coupling between the main and auxiliary oscillator systems, there is some interaction between the two, and this may make necessary readjustment of varicoupler 34 and occasionally of potentiometer 32 in order to obtain minimum indications on the indicating devices 15 and 44 under standard conditions before testing an unknown specimen.

After the foregoing adjustments have been made, indicating device 15 will indicate a transitory deflection whenever a defect or structural change comes within or leaves the magnetic influence of the coil system, and this will be true even of very minor defects because of the great sensitivity of the system to which the indicating device is coupled. On the other hand, the continuously displayed patterns on oscillograph 44 will indicate the full length of flaws or other variations passing through the fields of the test coils. By observing both indicating devices 15 and 44, defects of substantially all types as well as variations in composition or form of the material itself can be instantly observed and identified; and by observing oscillograph 44 can be measured as to magnitude. Thus the present invention provides in a single testing equipment not only great sensitivity but also the ability to indicate and measure substantially all types of defects encountered in metallic materials especially at the mill.

The apparatus described may be used to inspect specimens of uniform cross-section such as bars and tubes of non-ferrous or ferrous materials including copper, brass, aluminum, hot-rolled, cold-drawn, annealed, alloy, stainless steel and many other products. When inspecting non-ferrous or non-magnetic material it is not necessary to use direct-current energizing coil 16, but when testing magnetic material the superposition of a direct-current field has a very beneficial effect upon the test performance of the specimen under observation. Without the superposition of a direct-current field, slight but meaningless changes in permeability of the material may be excessive for the extreme sensitivity of the present testing equipment. These undesired fluctuations can be reduced to insignificant values by the superposition of a relatively weak direct-current field. In this case, as previously mentioned, a coil having 4,000 or 5,000 ampere turns is sufficient. The advantage of such direct-current superposition is mentioned in Austrian Patent No. 98,935, published December 27, 1924, which discloses an alternating-current field combined with a direct-current field to obtain results which cannot be duplicated by using either alternating-current or direct-current energization alone.

In order better to understand the operation of the system of the present invention it is helpful to analyze the changes in the apparent inductance of coils 3 and 8 when a metallic body passes through the fields of these coils. Assuming first that the conducting body is composed of a non-ferrous metal, then, according to well known laws, the passage of such a body increases the apparent resistance and lowers the apparent inductance of this coil. The same, of course, holds true for a body of ferrous material, except for the fact that its higher permeability checks the tendency of the inductance to drop and in most cases results in a somewhat higher inductance value. The increase caused by the higher permeability is, however, not of a magnitude which would correspond to the actual permeability value. For instance, the passing of a steel bar having a permeability of 200 to 400 times the permeability of air through a concentrically disposed coil carrying alternating current at 60 cycles increases the inductance from 200% to 400% only. Upon increase of applied frequency, the apparent inductance due to the iron decreases and very soon drops to a value where it equals the inductance of an air-core coil. The frequency at which this equality occurs is sometimes called the "critical" frequency. It depends upon the grade and size of the material involved, and for solid material is found well within the range of the upper audio frequencies.

Superimposing a D. C. (direct-current) field upon the field of an A. C. (alternating-current) energizing coil containing a ferro-magnetic body has the effect of artificially lowering the value of critical frequency or the amount of apparent A. C. permeability. I have found that for higher frequencies the effect of the superimposed D. C. field is more pronounced and, in other words, less D. C. magnetization is required to make the material non-magnetic with relation to the applied A. C. Using lower frequencies of the order of 500 to 1,000 cycles, higher D. C. magnetization is needed to achieve this purpose than with frequencies of the order of 5,000 to 10,000 cycles. In no case, however, does the superimposed D. C. saturate the material to such an extent that it becomes non-magnetic solely on account of its magnetic saturation. It appears to be a physical impossibility to attain magnetic saturation in open magnetic circuits even by the most intense D. C. fields. The effect observed and ascribed by some investigators to magnetic "saturation" of the material, appears to represent simply the effect of the alternating magnetic phenomenon described above.

As pointed out in my mentioned copending Patent No. 2,267,884 the type of oscillator here described is affected by changes in the tuned output circuit resulting in a pronounced amplitude change of the voltages impressed upon coils 3 and 8. This characteristic is, however, desirable in the testing system of this invention because the variations in oscillator output are thereby more pronounced in the presence of defects or variations in the material under test. Although as above stated, oscillators of the variable feedback type have proved to be preferable for the uses indicated, other forms of oscillator could be employed especially to replace oscillator 101 in Figs. 1 and 2. For example an audio-frequency oscillator of the heterodyne or of the negative resistance type could be employed.

Fig. 3 is a schematic diagram showing the manner in which the coils comprising the coil assembly of Fig. 2 may be physically disposed so that the material under test passes through them. For clarity in the drawings, coil 16 has not been illustrated in Fig. 3, but it may be wound concentrically with all of the other coils from coil 111 to coil 112, and so as to envelope them if desired. With this coil arrangement lower frequencies can be employed than with the arrangement of Fig. 4. For example, frequencies in the neighborhood of 4,000 cycles can be employed.

Fig. 4, similarly, is a schematic diagram showing the manner in which the same coils as in Fig. 3 may be laterally displaced so that the material under test does not pass through them, but passes in symmetrical relation through the fields of those coils, such as disclosed in my copending application for U. S. Letters Patent Serial No. 334,790, filed May 13, 1940. This latter arrangement is frequently more convenient in connection with testing material at the mill, and with such eccentric arrangement it is not necessary to superimpose direct-current energization, so coil 16 is not here shown. Due to the small diameter of the coils preferably employed in this arrangement, somewhat higher frequencies, for example in the neighborhood of 15,000 cycles, may be employed. The coil arrangements of Figs. 3 and 4 may also be taken as illustrations of alternative physical dispositions of the coils of Fig. 1, insofar as corresponding coils are represented in those figures.

I claim:

1. In apparatus for electromagnetic inspection of material, the combination which comprises a main oscillator system having an output circuit, an auxiliary oscillator system having an output circuit, a separate energizing coil connected in an output circuit of each of said oscillator systems and forming a tuning element thereof, a secondary circuit differentially coupled to said oscillator systems, an indicating device connected to said secondary system so as to indicate changes in magnitude and phase of the voltage induced in said secondary circuit by said oscillator systems, adjustable means associated with at least one of said oscillators whereby to synchronize said oscillators, and adjustable means associated with said secondary circuit and one of said oscillator systems for balancing the voltage established in one of said energizing coils against the voltage established in the other of said energizing coils while said oscillators are synchronized.

2. In apparatus for electromagnetic inspection of material, the combination which comprises a main oscillator system having an output circuit, an auxiliary oscillator system having an output circuit, a separate energizing coil connected in an output circuit of each of said oscillator systems and forming a tuning element thereof, a secondary circuit differentially coupled to said oscillator systems, an indicating device connected to said secondary system so as to indicate changes in magnitude and phase of the voltage induced in said secondary circuit by said oscillator systems, and adjustable means associated with said secondary circuit and one of said oscillator systems for balancing the voltage established in one of said energizing coils against the voltage established in the other of said energizing coils.

3. In apparatus for electromagnetic inspection of material, the combination which comprises a main oscillator system including a variable feedback oscillator having an output circuit, an auxiliary oscillator system comprising a variable feedback oscillator having an output circuit, a separate energizing coil connected in an output circuit of each of said oscillator systems and forming a tuning element thereof, a secondary circuit differentially coupled to said oscillator systems through said energizing coils, an indicating device connected to said secondary circuit so as to indicate changes in magnitude and phase of the voltage induced in said secondary circuit by said oscillator systems, control means associated with each oscillator for adjusting the output thereof, and adjustable means associated with said secondary circuit and one of said oscillator systems for balancing the voltage established across one of said energizing coils against the voltage established across the other of said energizing coils.

4. In apparatus for electromagnetic inspection of material, the combination which comprises a main oscillator system including a varible feedback oscillator having an output circuit; an energizing coil connected in an output circuit of said main oscillator system and forming a tuning element thereof; an auxiliary oscillator system including a variable feedback oscillator having an output circuit comprising in series an auxiliary coil and a variocoupler primary coil, and a tuning condenser connected across said auxiliary and primary coils; a secondary circuit including a variocoupler secondary coil and two secondary coils coupled respectively to said energizing coil and to said auxiliary coil; means including said energizing coil and at least one of said secondary coils whereby said material may be disposed in inductive relation to said primary and secondary circuits; and indicating means connected to said secondary circuit so as to indicate changes in magnitude and phase of voltage induced in said secondary circuit by said oscillator systems.

5. Apparatus according to claim 4, including vacuum tubes in said oscillators, a source of anode potential for said vacuum tubes and an adjustable resistor connected in series with said source and in common to the anode circuits of said tubes whereby to synchronize said oscillators.

6. Apparatus according to claim 4, including adjustable means common to both said oscillators whereby to synchronize said oscillators under standard conditions.

7. In apparatus for electromagnetic inspection of material, the combination which comprises a main oscillator system including a feedback oscillator, a tuned primary circuit comprising an energizing coil connected in shunt with a condenser, said primary circuit being effectively connected in an output circuit of said oscillator whereby said coil forms a tuning element of said oscillator; an auxiliary oscillator system including an auxiliary feedback oscillator, and a tuned primary circuit comprising an auxiliary coil connected in series with a primary winding of a variocoupler, and a tuning condenser connected in shunt with said auxiliary coil and primary winding; a secondary circuit comprising a first secondary coil coupled to said energizing coil and connected in circuit with a secondary winding of said variocoupler and with a second secondary coil which is coupled to said auxiliary coil; and indicating device one portion of which is coupled across said secondary winding and said second secondary coil and another portion of which is connected across all of the coils and windings in said secondary circuit; and means for passing said material through the fields of said energizing coil and of said first secondary coil.

8. In apparatus for electromagnetic inspection of material, the combination which comprises a main oscillator system including a feedback oscillator, a tuned primary circuit comprising an energizing coil connected in shunt with a condenser, said primary circuit being effectively connected in an output circuit of said oscillator whereby said coil forms a tuning element of said oscillator; an auxiliary oscillator system including an auxiliary feedback oscillator, and a tuned primary circuit comprising an auxiliary coil connected in series with a primary winding of a variocoupler, and a tuning condenser connected in shunt with said auxiliary coil and primary winding; a second circuit comprising a first secondary coil coupled to said energizing coil and connected in circuit with a secondary winding of said variocoupler and with a second secondary coil which is coupled to said auxiliary coil; an indicating device one portion of which is coupled across said secondary winding and said second secondary coil and another portion of which is connected across all of the coils and windings in said secondary circuit; means for adjusting the magnitude of the output of each of said oscillators; a direct-current coil and means for passing adjustably controllable direct current therethrough; and means for passing said material through the fields of said energizing coil, said first secondary coil and said direct-current coil.

9. In apparatus for electromagnetic inspection of metallic material for variations in structure and composition, the combination which comprises a main oscillator system including a first feedback oscillator, a tuned primary circuit comprising an energizing coil connected in series with a first primary winding of a variocoupler, and a tuning condenser connected in shunt with said coil and winding, said primary circuit being effectively connected in an output circuit of said oscillator whereby said energizing coil forms a tuning element of said oscillator; an auxiliary system including a tuned primary circuit comprising a first auxiliary coil connected in series with a second primary winding of said variocoupler, a tuning condenser connected in shunt with said auxiliary coil and second primary winding, and an amplifier connected to couple an output circuit of said oscillator to said primary circuit of said auxiliary system; a detector circuit comprising a first detector coil coupled to said energizing coil and connected in series with a first variable condenser, with a second detector coil which is coupled to said auxiliary coil and with a first variocoupler secondary winding which is adjustably coupled to said first and second primary windings; an auxiliary variable feedback oscillator system including a second variable feedback oscillator having an output circuit comprising in series a second auxiliary coil, a variocoupler primary coil and a tuning condenser connected across said primary and second auxiliary coils; a secondary circuit including in series a second variocoupler secondary coil coupled to said variocoupler primary coil, a second variable condenser, a first secondary coil coupled to said first auxiliary coil, a second secondary coil coupled to said energizing coil, and a third secondary coil coupled to said second auxiliary coil; a first indicating device coupled across said first variable condenser; a second indicating device one portion of which is coupled across said second variocoupler secondary coil and said third secondary coil, and the other portion of which is coupled across all of the coils and windings in said secondary circuit; and means for passing said material through the fields of said energizing and first auxiliary coils, said first and second detector coils and said first and second secondary coils.

10. Apparatus according to claim 9 including adjustable coupling means common to both said oscillators whereby to synchronize said oscillators under standard conditions.

11. In apparatus for electromagnetic inspection of metallic material for variations in structure and composition, the combination which comprises a main oscillator system including a first feedback oscillator, a tuned primary circuit comprising an energizing coil connected in series with a first primary winding of a variocoupler, and a tuning condenser connected in shunt with said coil and winding, said primary circuit being effectively connected in an output circuit of said oscillator whereby said energizing coil forms a tuning element of said oscillator; an auxiliary system including a tuned primary circuit comprising a first auxiliary coil connected in series with a second primary winding of said variocoupler, a tuning condenser connected in shunt with said auxiliary coil and second primary winding, and an amplifier connected to couple an output circuit of said oscillator to said primary circuit of said auxiliary system; a detector circuit comprising a first detector coil coupled to said energizing coil and connected in series with a first variable condenser, with a second detector coil which is coupled to said auxiliary coil and with a first variocoupler secondary winding which is adjustably coupled to said first and second primary windings; an auxiliary variable feedback oscillator system including a second variable feedback oscillator having an output circuit comprising in series a second auxiliary coil, a variocoupler primary coil and a tuning condenser connected across said primary and second auxiliary coils; a secondary circuit including in series a second variocoupler secondary coil coupled to said variocoupler primary coil, a second variable condenser, a first secondary coil coupled to said first auxiliary coil, a second secondary coil coupled to said energizing coil, and a third secondary coil coupled to said second auxiliary coil; a first indicating device coupled across said first variable condenser; a second indicating device comprising an oscillograph having two sets of deflecting plates, one set of plates being coupled across said second variocoupler secondary coil and said third secondary coil, and the other set of plates being coupled across all of the coils and windings in said secondary circuit; means for adjusting the degree of amplification of said amplifier; means for adjusting the magnitudes of the outputs of both of said oscillators; a direct-current coil and means for passing adjustably controllable direct current therethrough; and means for passing said material through the fields of said energizing and first auxiliary coils, said first and second detector coils, said first and second secondary coils and said direct-current coil.

12. Apparatus according to claim 11 including vacuum tubes in said oscillators, a source of anode potential for said vacuum tubes and an adjustable resistor connected in series with said source and in common to the anode circuits of said tubes whereby to synchronize said oscillators.

13. In apparatus for electromagnetic inspection of metallic material for variations in structure and composition, the combination which comprises a main oscillator system including a first feedback oscillator and a first tuned energizing coil connected in an output circuit of said oscillator whereby at least in part to determine the frequency of said oscillator; and auxiliary system energized by said oscillator and including a first tuned auxiliary coil; an auxiliary oscillator system including a second feedback oscillator and a second tuned energizing coil connected in an output circuit of said auxiliary oscillator whereby at least in part to determine the frequency of said auxiliary oscillator; a secondary circuit including a first coil coupled to said energizing coil, a second coil coupled to said first tuned auxiliary coil and a third coil coupled to said second tuned energizing coil; a detector circuit including a first detector coil coupled to said first tuned energizing coil and a second detector coil coupled to said first tuned auxiliary coil; indicating means coupled to a plurality of elements of said secondary circuit; indicating means coupled to at least one element of said detector circuit; and means for passing said material through the fields of said first tuned energizing and auxiliary coils, said first and second coils in said secondary circuit, and said first and second detector coils.

14. In apparatus for electromagnetic inspection of metallic material for variations in structure and composition, the combination which comprises a main oscillator system including a first feedback oscillator and a first tuned energizing coil connected in an output circuit of said oscillator whereby at least in part to determine the frequency of said oscillator; an auxiliary system energized by said oscillator and including an adjustably tunable circuit having a first auxiliary coil; an auxiliary oscillator system including a second feedback oscillator and a second energizing coil adjustably tunable and connected in an output circuit of said auxiliary oscillator whereby in part to determine the frequency of said auxiliary oscillator; a secondary circuit including a first coil coupled to said energizing coil, a second coil coupled to said first auxiliary coil and a third coil coupled to said second energizing coil; a detector circuit including a first detector coil coupled to said first tuned energizing coil and a second detector coil coupled to said first auxiliary coil; indicating means coupled to a plurality of elements of said secondary circuit; indicating means coupled to at least one element of said detector circuit; and means for passing said material through the fields of said first energizing and auxiliary coils, said first and second coils in said secondary circuit, and said first and second detector coils.

15. In apparatus for electromagnetic inspection of metallic material for variations in structure and composition, the combination which comprises, a main oscillator system including a first feedback oscillator and a first tuned energizing coil connected in an output circuit of said oscillator whereby at least in part to determine the frequency of said oscillator; an auxiliary system energized by said oscillator and including a first tuned auxiliary coil; an auxiliary oscillator system including a second feedback oscillator and a second tuned energizing coil connected in an output circuit of said auxiliary oscillator whereby at least in part to determine the frequency of said auxiliary oscillator; a secondary circuit including a first coil coupled to said energizing coil, a second coil coupled to said first tuned auxiliary coil and a third coil coupled to said second tuned energizing coil; a detector circuit including a first detector coil coupled to said first tuned energizing coil and a second detector coil coupled to said first tuned auxiliary coil; indicating means coupled to a plurality of elements of said secondary circuit; indicating means coupled to at least one element of said detector circuit; means for adjusting the magnitude of the output of each said oscillator; a direct-current coil and means for passing adjustably controllable direct current therethrough; and means for passing said material through the fields of said first tuned energizing and auxiliary coils, said first and second coils in said secondary circuit, said first and second detector coils and said direct-current coil.

16. Apparatus according to claim 15 including vacuum tubes in said oscillators, a source of anode potential for said vacuum tubes and an adjustable resistor connected in series with said source and in common to the anode circuits of said tubes whereby to synchronize said oscillators.

17. In apparatus for electromagnetic inspection of material, the combination which includes, two oscillator systems, a secondary circuit coupled to both of said systems, means for differentially coupling said oscillator systems through said secondary circuit, means for balancing the voltages induced in said secondary circuit by both of said oscillator systems as to magnitude and phase, means for passing material to be inspected in inductive relation to elements of said secondary circuit and of one of said oscillator systems, and an indicating device coupled to said secondary circuit.

18. In apparatus for electromagnetic inspection of material, the combination which includes, two oscillator systems, each oscillator system including an oscillator of the feedback type, a secondary circuit including two coils each coupled to one of said oscillator systems, respectively, means for differentially coupling a coil in each of said oscillator systems to one of said coils in said secondary circuit, respectively, means for balancing the voltages induced in said secondary circuit by both of said oscillator systems as to magnitude and phase, means for passing material to be inspected in inductive relation to a coil in one of said oscillator systems and to a coil in said secondary circuit, and an oscillograph coupled to said secondary circuit.

19. In apparatus for electromagnetic inspection of material the combination which includes two oscillator systems, each oscillator system including an oscillator of the feedback type, a secondary circuit including two coils each coupled to one of said oscillator systems, respectively, means for balancing the voltages induced in said secondary circuit by both of said oscillator systems as to magnitude and phase, means for impressing a voltage induced in one of said secondary coils across one of said sets of plates, means for impressing the sum of the voltages induced in both of said coils across the other of said sets of plates, means for passing material to be inspected in inductive relation to coils in said secondary circuit and to a coil in one of said oscillator systems, and an oscillograph having two sets of deflection plates connected to said secondary circuit.

THEODORE ZUSCHLAG.